May 6, 1941.  K. L. HERTEL  2,240,988
LIQUID LEVEL INDICATOR
Filed Sept. 20, 1938
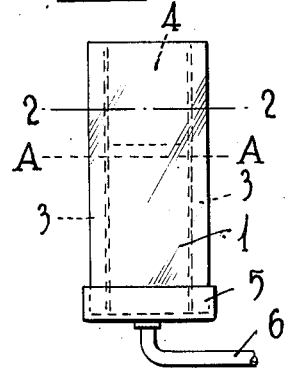
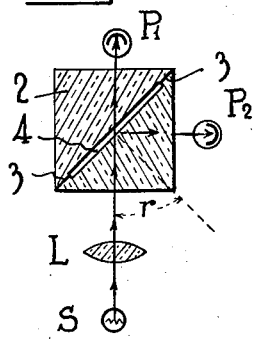
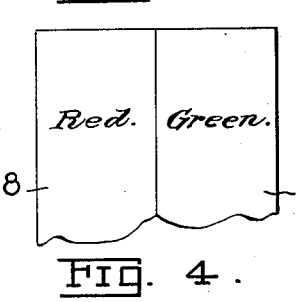
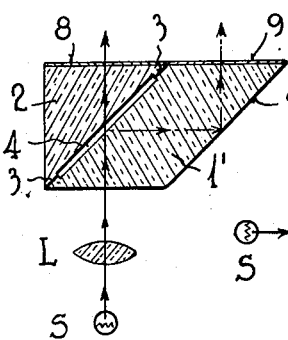
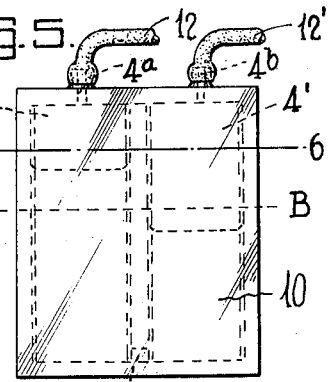
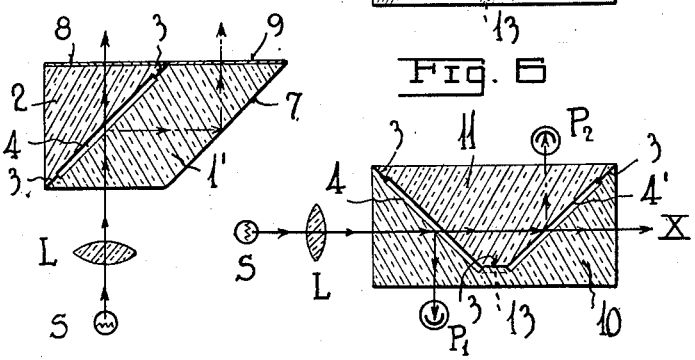
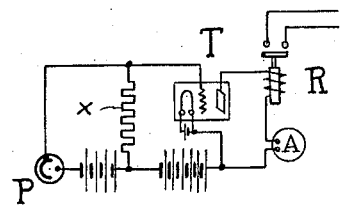
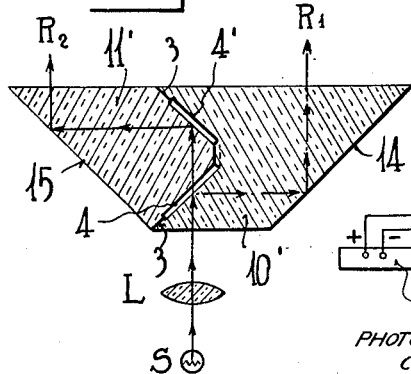
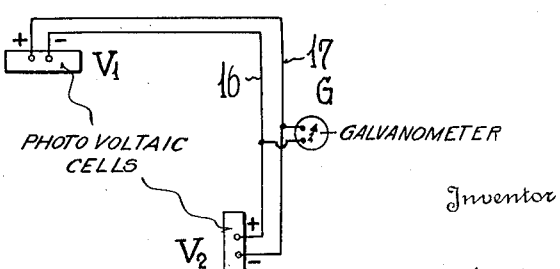
Inventor
Kenneth L. Hertel,
By Stone, Boyden & Mack,
Attorneys.

Patented May 6, 1941

2,240,988

UNITED STATES PATENT OFFICE 2,240,988

LIQUID LEVEL INDICATOR

Kenneth L. Hertel, Knoxville, Tenn., assignor to The University of Tennessee Research Corporation, Knoxville, Tenn., a corporation of Tennessee Application September 20, 1938, Serial No. 230,895

3 Claims. (Cl. 73—293)

This invention relates to means responsive to changes in the height of a column of liquid, and more particularly to such means employing a beam of light.

The invention is based upon the principle of total reflection of light from the interface of two transparent mediums of different indices of refraction when the beam passes to such interface through the medium of high index of refraction at an angle greater than the critical angle.

In order that the invention may be readily understood, reference is had to the accompanying drawing forming part of this specification, and in which—

Fig. 1 is a front elevation of a liquid column formed between a pair of transparent prisms, in accordance with the invention;

Fig. 2 is a transverse section on the line 2—2 of Fig. 1, also diagrammatically showing a source of light and two photoelectric cells which I employ;

Fig. 3 is a fragmentary rear elevation, and Fig. 4 a transverse section of a slightly modified form of prisms;

Fig. 5 is a front elevation of a still further modified arrangement of prisms in which two liquid columns, connected at their lower ends, are provided;

Fig. 6 is a transverse section on the line 6—6 of Fig. 5, showing, in addition, a source of light and the position of two photoelectric cells which are employed;

Fig. 7 is a transverse section similar to Fig. 6, but showing a further modified form of prisms;

Fig. 8 is a diagram illustrating one means for amplifying and utilizing the current from a photoelectric cell of the character illustrated in the preceding figures; and Fig. 9 is a diagram illustrating a modified arrangement utilizing a pair of cells of somewhat different type.

Referring to the drawing in detail, and first more particularly to Figs. 1 and 2 thereof, 1 and 2 designate a pair of prisms formed of transparent material such as glass, or a synthetic resin or the like, such for example as those sold under the trade names "Bakelite," "Lucite," or "Plexiglas." These prisms are shown as having a section in the form of a right triangle. The hypotenuse of each triangle is, however, slightly depressed throughout the greater portion of its length, so that when the two triangular prisms are assembled with their hypotenuses facing each other, there is formed a substantially rectangular prism structure having within itself an elongated thin, flat chamber 4, having plane parallel walls extending parallel with the edges of the prism, and disposed substantially diagonally of the rectangle, as clearly shown in Fig. 2. The meeting edges of the two triangular prisms beyond the chamber 4 are united by a suitable cement as shown at 3. The composite prism structure, formed as above described, may be conveniently mounted in a socket 5 to which is connected a pipe 6 communicating with a reservoir, the liquid level in which is to be indicated or controlled. The chamber 4, forming a thin, flat liquid column, may, if desired, constitute one leg of a manometer, and in this case, the upper end of either leg may be connected with a fluid, changes in the pressure of which it is desired to indicate.

Referring to Fig. 2, I have illustrated a source of light S and a lens L arranged to direct a beam of light from the source toward the chamber 4 in a direction making an acute angle with a line normal to the walls of this chamber as indicated at $r$.

As is well known, and in accordance with Snell's law, if $n$ is the index of refraction of the material of which the prism is made, with respect to the fluid above the liquid column in chamber 4, and $r$ the angle between the path of the beam of light through the prism and a line normal to the interface at the chamber 4, then if the angle is such as to result in the relation $n \sin r = 1$ $r$ is said to be the critical angle. When the light beam passes through the prism at any angle greater than this critical angle, it is totally reflected at the interface.

In utilizing the above principle, I may direct a beam of light from the source S at any angle greater than the critical angle, but in Fig. 2 I have shown it as directed normal to the outer face of the prism 1. I preferably employ two photoelectric cells $P_1$ and $P_2$, the first placed directly in line with the incident beam of light, and the other placed on a line intersecting the said line at an angle at the interface. This angle is shown as 90°, but may vary somewhat in accordance with different conditions.

Let us assume that the incident beams of light is directed against the prisms at some such level as indicated by the line A—A in Fig. 1. If the level of the liquid column in the chamber 4 is above this line, as shown, then the incident beam of light from the source S will be refracted by the liquid in the chamber 4 and will pass straight through the two prisms and the liquid column, and fall upon the photoelectric cell $P_1$.

If, on the other hand, the height of the liquid column in the chamber 4 falls to a point below the level A—A, then the beam of light will be totally reflected at the interface constituted by the flat wall of the chamber 4, and will be directed upon the photoelectric cell $P_2$.

Thus, by sharply focusing the light, and by arranging it at a level close to the normal height of the liquid column, a very slight variation in the height of such column will result in shifting the light from one photoelectric cell to the other.

Each photoelectric cell may be connected with an amplifying circuit, such as illustrated by way of example in Fig. 8, in which the photoelectric cell P is connected with suitable batteries and a resistance $x$, and with an amplifying tube T, in the plate circuit of which may be connected a relay R, and, if desired, an ammeter or other indicating instrument A. The relay R may control the circuit of suitable signaling devices, or may be arranged to throw into or out of operation any desired apparatus.

Referring now to Figs. 3 and 4, I have shown a prism 1' having a section in the form of a parallelogram, the outer inclined face 7 of which is substantially parallel with the chamber 4. The result of this is that when the liquid column is below the level of the light beam, and the beam is thus reflected at the interface of the chamber 4, it will be again reflected at the interface 7 and projected in the same direction as that of the incident beam. Thus an observer looking at the rear side of the prism structure would be able to see both the reflected beam and the incident beam which passes through the chamber 4 when the liquid column fills the same.

By placing upon the rear face of the prism structure shown in Fig. 4 diffusing color screens 8 and 9, showing red and green, for example, the observer would be able to readily determine from the illumination of one or the other of these color screens whether the height of the liquid column was above or below the normal level A—A of Fig. 1.

Referring now to Figs. 5 and 6, I have shown an arrangement comprising a pair of liquid columns connected at their lower ends, and constituting in effect a manometer. This modified structure is preferably formed by the prism 10 having a trough-shaped recess into which fits a second triangular prism 11, the point of the triangle being cut away so as to provide a flat surface for cementing to the prism 10 at this point as well as at the edges 3 thereof. These assembled prisms provide two flat walled chambers 4 and 4' disposed at an angle to each other and to the outside faces of the prism structure.

Two photoelectric cells $P_1$ and $P_2$ are employed as before, and are positioned to receive the beam reflected from the interface of the chamber 4 and chamber 4' respectively.

This two column arrangement of Figs. 5 and 6 is particularly useful as a sensitive manometer responsive to small pressure differentials. For this purpose the upper end of the chamber 4 is provided with a nipple $4^a$, and the upper end of the chamber 4' is provided with a nipple $4^b$. To these nipples may be connected tubes 12 and 12', respectively, communicating with the two sources of fluid pressure to be compared.

If the incident beam is directed against the prism structure at some such level as indicated at B—B in Fig. 5, it will be seen that if the two liquid columns are in the positions indicated, that is, one above and one below the line B—B, due to the fact that the pressure in chamber 4 is less than that in chamber 4', then the incident beam from the source S will be refracted and passed through the chamber 4 containing the liquid column, and will be totally reflected from the interface of the chamber 4' which contains only air or other gaseous fluid. The beam will thus be directed on to the photoelectric cell $P_2$.

If, on the other hand, the pressure in chamber 4 should become greater than that in chamber 4', the liquid column in the chamber 4, due to this relative increase of pressure, would fall below the line B—B, and the incident beam would be totally reflected at the interface of the chamber 4 and would be directed upon the photoelectric cell $P_1$.

When, however, the pressure is substantially equal in the two chambers, and the liquid stands at substantially the same level in both, such level being slightly above the line B—B, the beam will be refracted by the liquid in both chambers, and will pass straight on through the prism structure as indicated at X, without affecting either photoelectric cell.

Thus the arrangement will serve to indicate variations from a normal condition, as the light beam will be directed onto one photoelectric cell or the other in accordance with whether the relative height of the two liquid columns is respectively above or below the normal level, or, in other words, in accordance with whether a pressure difference exists, one way or the other, in the two chambers. Hence the pressure differences can be confined between very definite limits.

By raising or lowering the path of the light beam relative to the normal liquid level, the range through which the pressure difference may vary, before one or the other of the photoelectric cells is brought into action, can be made wide or narrow, as conditions may require.

In Fig. 7 I have shown how the principle illustrated in Fig. 4 can be applied to the structure shown in Fig. 6, namely an arrangement in which the beams reflected from the interface of both chambers are projected in the same direction. To this end, the prism 10' is provided with an inclined face 14 and the prism 11' is provided with an oppositely inclined face 15. Thus the beam of light which is reflected from the interfaces of the chambers 4 and 4' will respectively be reflected again from the inclined interfaces 14 and 15, and will be directed parallel with each other through the rear wall of the prism structure as at $R_1$ and $R_2$.

If, instead of employing photoelectric cells of the type above referred to, and focusing the beam of light upon them, I employ photovoltaic cells and use a different method of lighting, as, for example, parallel rays of diffused light, I may arrange such cells as shown in Fig. 9. In this figure, $V_1$ and $V_2$ designate photosensitive electric cells, such as photovoltaic cells, disposed at right angles to each other, as are the photoelectric cells in Fig. 2. These cells are of substantial internal resistance and are connected as by wires 16 and 17 in series with each other, being thus practically short circuited, and a galvanometer G of the center zero type is connected across these wires. If the illumination on the two cells is equal, the two terminals of the galvanometer are at the same potential and no current flows through the galvanometer, while if one cell is illuminated to a greater extent than the other, an unbalanced electromotive force will be set up which will cause current to flow through the galvanometer G, and produce a deflection thereof. This constitutes a convenient means for indicating at a distance the variations in the height of a column of liquid, and it has the advantage that the indications of the galvanometer are independent of any possible variations in the intensity of the light source.

It will, of course, be understood that in this last arrangement I contemplate illuminating a relatively large area of the prisms, such area extending the same distance above and below the line corresponding with the normal height of the column. Thus, when the liquid stands at this level, that portion of the light below the line is refracted, and falls upon one cell, while an equal portion of the light, which passes above the line, is reflected, and directed on to the other cell. Thus at normal level, the illumination of the two cells is the same.

What I claim is:

1. In a liquid level indicator, a transparent prism structure having at least two parallel walls and having within itself a thin, flat, elongated liquid receiving chamber extending parallel with the edges of said prism structure but disposed at an angle to said walls, said prism structure having another wall substantially parallel with the sides of said chamber, a variable column of liquid in said chamber, means for transmitting variations of a condition to said column, and means for directing a beam of light through the prism structure against and at an angle to one of the flat sides of said chamber, whereby said beam, when reflected by said flat side, due to the absence of liquid within the chamber at the level of the beam, is directed against and reflected again by said last mentioned wall.

2. In combination, a prism structure having within itself a pair of longitudinally extending, thin, flat liquid chambers disposed parallel with the edges of the prism but lying in planes at an angle to each other, said chambers containing a transparent liquid and being connected at one end so as to constitute the legs of a manometer, means for admitting into the other end of said legs fluids of varying relative pressures, and means for directing a single beam of light through said prism structure from one side thereof in a line which intersects both said chambers at a point adjacent the level of said liquid when the pressure in the two chambers is substantially equal.

3. Apparatus of the character described comprising a prism structure having a pair of parallel walls, and having within itself a longitudinally extending, thin, flat, liquid receiving chamber disposed at an angle to said walls and partly filled with a liquid, means communicating with said chamber whereby the level of the liquid therein may be caused to vary, means for directing a beam of light at substantial right angles to one of said walls through a portion of the prism structure and against the interface constituting a side of said chamber, whereby said beam is either reflected at said interface or transmitted through the prism structure in the direction of the incident beam, depending upon whether or not liquid is present in said chamber at the level of said beam, and means for causing the reflected beam to issue from said prism structure through the same wall as and parallel with the transmitted beam.

KENNETH L. HERTEL.